(12) United States Patent
Restall et al.

(10) Patent No.: US 10,327,606 B2
(45) Date of Patent: Jun. 25, 2019

(54) BLOWER UNIT

(71) Applicant: Crary Industries, Inc., West Fargo, ND (US)

(72) Inventors: Arran Restall, Louisville, KY (US); Wayne Spier, Fargo, ND (US)

(73) Assignee: Crary Industries, Inc., West Fargo, ND (US)

(*) Notice: Subject to any disclaimer, the term of this patent is extended or adjusted under 35 U.S.C. 154(b) by 0 days.

(21) Appl. No.: 15/820,865

(22) Filed: Nov. 22, 2017

(65) Prior Publication Data
US 2018/0103810 A1 Apr. 19, 2018

Related U.S. Application Data

(63) Continuation-in-part of application No. 14/557,731, filed on Dec. 2, 2014.

(51) Int. Cl.
| | |
|---|---|
| *A47L 5/14* | (2006.01) |
| *B62B 3/02* | (2006.01) |
| *B62B 3/10* | (2006.01) |
| *B25F 5/02* | (2006.01) |
| *A01G 20/43* | (2018.01) |
| *A47L 5/22* | (2006.01) |
| *E01H 1/08* | (2006.01) |

(52) U.S. Cl.
CPC ............... *A47L 5/14* (2013.01); *A01G 20/43* (2018.02); *A47L 5/22* (2013.01); *B25F 5/021* (2013.01); *B62B 3/02* (2013.01); *B62B 3/10* (2013.01); *E01H 1/0809* (2013.01)

(58) Field of Classification Search
CPC ........... A01G 1/125; A01G 20/43; A47L 5/14; A47L 5/22; E01H 1/0809
See application file for complete search history.

(56) References Cited

U.S. PATENT DOCUMENTS

| | | | | |
|---|---|---|---|---|
| 5,107,566 A * | 4/1992 | Schmid | ............... | A47L 7/04 15/328 |
| 6,226,833 B1 * | 5/2001 | Kawaguchi | ............... | A47L 5/14 15/405 |
| 6,742,995 B1 * | 6/2004 | Wood | ............... | F04B 35/06 137/269 |
| 6,883,736 B1 * | 4/2005 | Blatt | ............... | A01C 15/04 222/626 |

(Continued)

*Primary Examiner* — Kevin F Murphy
(74) *Attorney, Agent, or Firm* — Wood, Phillips, Katz, Clark & Mortimer

(57) ABSTRACT

A blower unit having a frame and at least one wheel on the frame through which the frame can be supported upon and moved over a subjacent support surface. A handle assembly has at least one gripping region that is configured to be engaged by a user situated at the rear of the blower unit. A source of pressurized air has an outlet at which a volume of pressurized air is discharged. A pressurized air handling system on the frame has a conduit assembly defining first and second flow paths through which pressurized air from the outlet of the source of pressurized air is selectively delivered respectively to first and second outlets. The pressurized air handling system further has an air control with at least first and second states in which different volumes of pressurized air are delivered to the first and second outlets.

20 Claims, 7 Drawing Sheets

(56) References Cited

U.S. PATENT DOCUMENTS

| | | | |
|---|---|---|---|
| 7,419,106 B2* | 9/2008 | Eavenson, Sr. | A01G 20/43 239/461 |
| 8,413,957 B2* | 4/2013 | Fandel | F16K 31/465 137/315.38 |
| 9,750,180 B2 | 9/2017 | Pearson | |
| 2007/0136983 A1* | 6/2007 | Oberhofer | E01H 1/0809 15/330 |
| 2010/0133365 A1* | 6/2010 | Bailey | E01C 19/203 239/663 |
| 2016/0150922 A1 | 6/2016 | Restall et al. | |

* cited by examiner

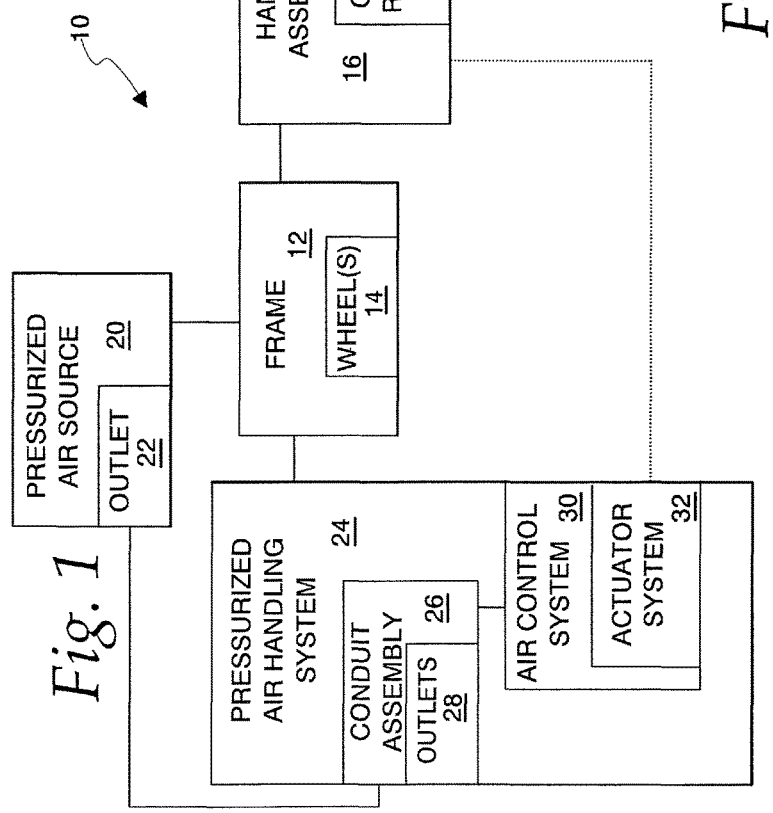
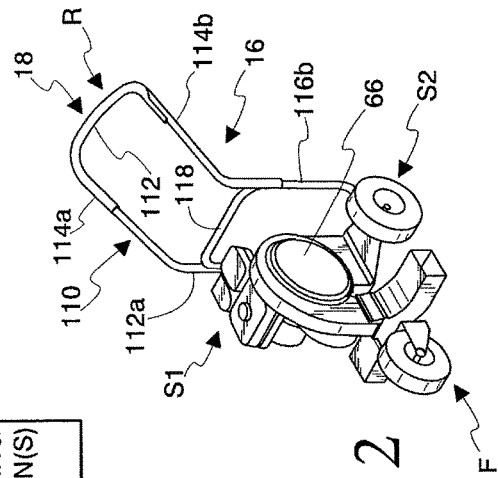
Fig. 1
Fig. 2

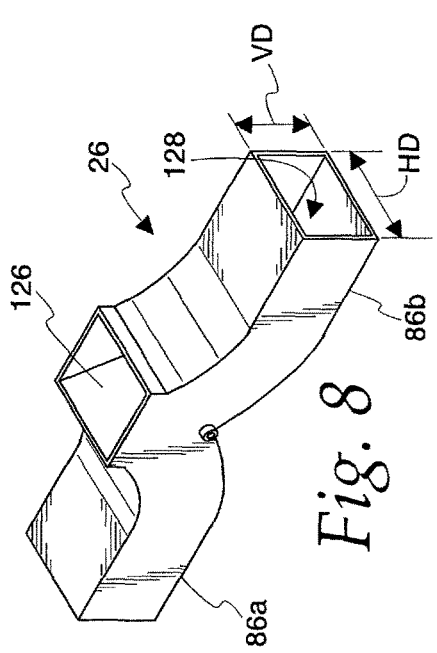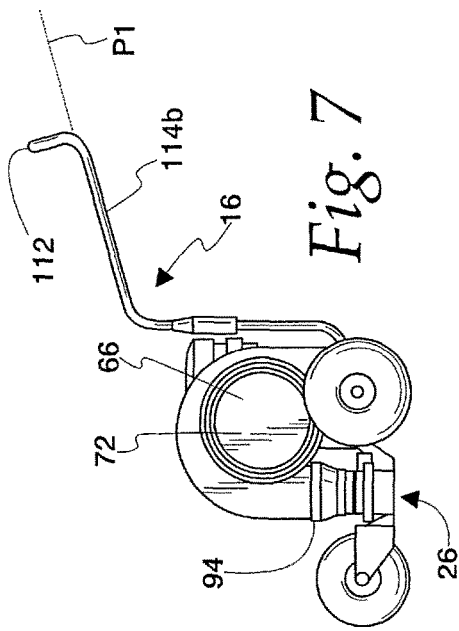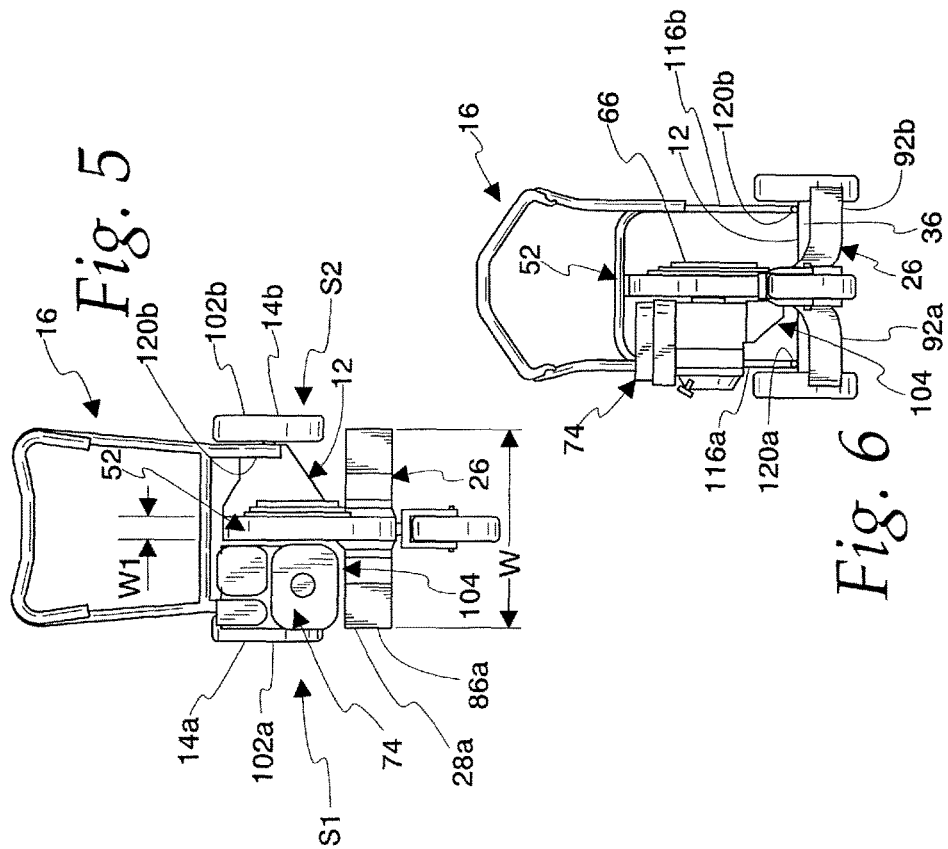

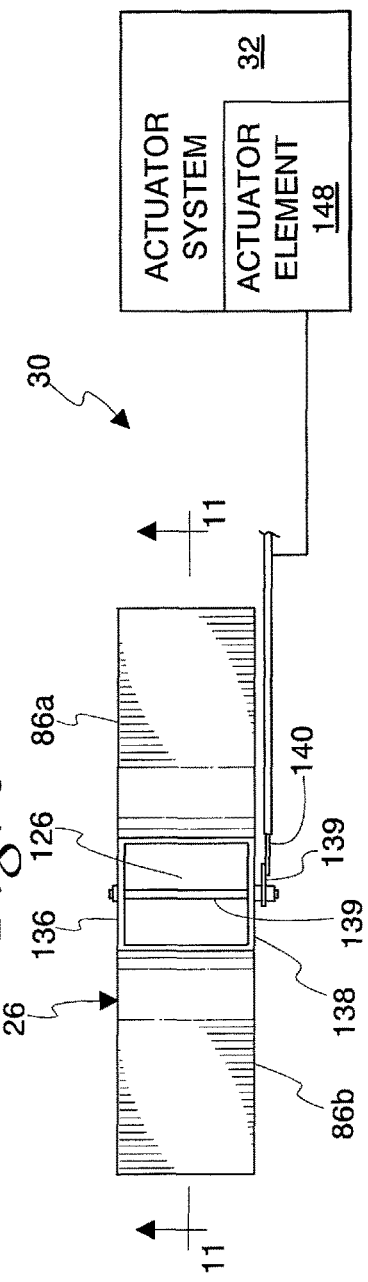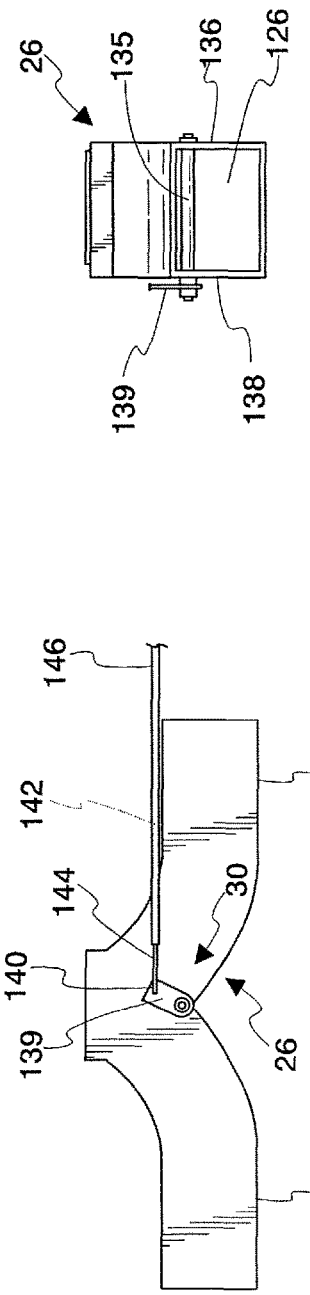

BLOWER UNIT

CROSS-REFERENCE TO RELATED APPLICATIONS

This application is a continuation-in-part of U.S. patent application Ser. No. 14/557,731, filed Dec. 2, 2014.

BACKGROUND OF THE INVENTION

Field of the Invention

This invention relates to landscaping equipment and, more particularly, to a blower unit that can be advanced over a subjacent support surface to redistribute loose material thereon.

Background Art

Blower assemblies have been commonly incorporated into wheeled frames to define portable units that are used to distribute loose material on subjacent terrain. Typically, such landscaping equipment has a rear handle assembly with one or more gripping members that can be engaged by a user to apply forces to maneuver the unit. Front and rear, laterally spaced spaced wheel pairs, or a tricycle wheel arrangement, support the unit and facilitate advancement thereof over the supporting subjacent surface.

The blower assembly that is incorporated into the wheeled frame has a fan assembly that is rotated by a drive, that commonly is a gas operated engine. A housing defines a chamber within which the fan assembly operates and has an associated conduit at which pressurized air generated through the fan assembly is discharged in an air stream that exits in a generally straight flow pattern.

A common blower assembly design has a fixed discharge conduit orientation which causes the pressurized air to exit laterally, which is generally orthogonal to the normal fore-and-aft travel path utilized by most users. Users of this type of unit, while treating a substantial areal extent, normally take the same approach. That is, the user will advance the unit in a first straight line which causes material to be propelled by the pressurized air stream to one side. To progressively shift the loose material to the same one side, the user will repeatedly move the unit in parallel lines, while maintaining the orientation of the unit as the loose material progressively accumulates further to the one side. Some users choose to travel every other linear path portion by drawing the unit backwards. By reason of the fixed configuration, the user experiences limitations as to how he/she can efficiently treat a large areal space, and often resorts to inconvenient movements, such as the reverse drawing of the unit, described above.

While some units incorporate the ability to reconfigure the blower assembly so that the discharge direction for the pressurized air supply is changed, these structures are generally of a nature that this process is not capable of being performed easily and quickly. The user may have to repeatedly release the handle and walk around the unit to make an adjustment. To avoid this inconvenience, and in the interest of saving time, users may often decide not to take advantage of an adjusting capability and operate the unit in a single state while contending with the problems and inconveniences, some of which are noted above.

These shortcuts may prompt the user to operate the equipment in a manner whereby the overall quality of the ground treatment is compromised.

It is an objective of designers of blower units to control size and weight. This is important to make operation convenient and manageable for all users. Compact, lightweight designs can be readily maneuvered around obstructions and in tight spaces while minimizing user fatigue. A compact, lightweight design is also important to professional landscapers that may be required to lift blower units onto transporting vehicles as the blower unit is moved from one site to the next.

Another design objective is to make the blower unit with a configuration that can be efficiently manufactured and offered to users in different categories—homeowners, professional landscapers, etc.—at a reasonable price. Simplicity may also avoid in-field maintenance problems which are particularly difficult for landscape professionals when crews are paid hourly for their service.

In spite of the fact that blower technology in the landscaping area has been evolving for many decades, the above problems are contended with to this day. Blower unit designs currently do not exist in the market that are adequately versatile, practical to use, and affordable to those individuals and businesses that utilize this type of equipment.

SUMMARY OF THE INVENTION

In one form, the invention is directed to a blower unit having a front and rear and laterally spaced sides. The blower unit is made up of a frame, at least one wheel on the frame through which the frame can be supported upon and moved over a subjacent support surface, a handle assembly, a source of pressurized air, and a pressurized air handling system. The handle assembly has at least one gripping region configured to be engaged by a user situated at the rear of the blower unit and at which forces can be applied by the user to reposition the blower unit relative to a subjacent support surface. The source of pressurized air has an outlet at which a volume of pressurized air is discharged. The pressurized air handling system on the frame includes a conduit assembly defining first and second flow paths through which pressurized air from the outlet of the source of pressurized air is delivered respectively to first and second outlets. The pressurized air handling system further includes an air control system. The air control system has at least first and second states. The air control system in the first state causes one of: a) substantially all of the volume of pressurized air discharged at the outlet of the source of pressurized air to be directed in the first path to the first outlet; or b) only a part of the volume of pressurized air discharged at the outlet of the source of pressurized air to be directed in the first path to the first outlet. The air control system in the second state causes one of: a) substantially all of the volume of pressurized air discharged at the outlet of the source of pressurized air to be directed in the second path to the second outlet; or b) only another part of the volume of pressurized air discharged at the outlet of the source of pressurized air to be directed in the second path to the second inlet. The air control system further includes a user operable actuator system that is operable by a user situated at the rear of the blower unit to change the air control system between the first and second states.

In one form, the user operable actuator system includes an actuator element on the handle assembly.

In one form, the source of pressurized air is a centrifugal fan.

In one form, the centrifugal fan has an impeller assembly that turns around a laterally extending axis.

In one form, the centrifugal fan has a housing that defines the outlet for the source of pressurized air. The housing is configured to cause pressurized air to be propelled downwardly to the conduit assembly.

In one form, the conduit assembly has an inverted "V" shape with an inlet that receives pressurized air from the outlet for the source of pressurized air. The "V" shape is defined by first and second conduit branches each extending from an apex of the "V" and respectively communicating pressurized air to the first and second outlets.

In one form, the source of pressurized air is a centrifugal fan. The centrifugal fan has a housing that defines the outlet for the source of pressurized air. The housing is configured to cause pressurized air to be propelled downwardly to the inlet of the conduit assembly.

In one form, the air control system includes a deflector that is moved relative to the conduit assembly as the air control system is changed between the first and second states.

In one form, the deflector pivots around an axis relative to the conduit assembly between first and second positions. The deflector is in the first position with the air control system in the first state and in the second position with the air control system in the second state.

In one form, the air control system has a cable part that is movable to change the position of the deflector. The user operable actuation system includes an actuator element on the handle assembly.

In one form, with the air control system in the first state, substantially all of the volume of pressurized air discharged at the outlet of the source of pressurized air is directed in the first path to the first outlet. With the control system in the second state, substantially all of the volume of pressurized air discharged at the outlet of the source of pressurized air is directed in the second path to the second outlet.

In one form, the blower unit further includes an adaptor between the outlet for the source of pressurized air and the inlet of the conduit assembly. The adaptor assembly has an inlet end and an outlet end and a passageway that communicates between the inlet and outlet ends.

In one form, the at least one wheel includes two rear wheels and a front wheel laterally between the two rear wheels.

In one form, the handle assembly has a forwardly opening U-shaped portion with a base and first and second legs projecting forwardly from the base. The base has a part that is configured to be grasped by a user.

In one form, the first and second conduit branches respectively have first and second straight portions that extend horizontally respectively up to the first and second outlets.

In one form, the first and second conduit branches have bottom flat wall portions that reside in a common horizontal plane.

In one form, the impeller assembly has an axial width centered between the laterally spaced sides of the blower unit.

In one form, the source of pressurized air has a drive for the impeller assembly that resides in a space extending from one side of the impeller assembly towards one side of the blower unit.

In one form, the centrifugal fan has a housing that defines the outlet for the source of pressurized air. The drive for the impeller assembly is supported in an operative position by the centrifugal fan housing.

In one form, the conduit assembly is configured so that pressurized air delivered to the first and second outlets discharges from the first and second outlets respectively in first and second streams directed in laterally opposite directions.

BRIEF DESCRIPTION OF THE DRAWINGS

FIG. 1 is a schematic representation of a blower unit, according to the present invention;

FIG. 2 is a front perspective view of one specific form of blower unit, as shown generically in FIG. 1;

FIG. 5 is a plan view of the blower unit in FIGS. 2-4;

FIG. 6 is a front elevation view of the blower unit in FIGS. 2-6;

FIG. 7 is an elevation view of the blower unit in FIGS. 2-6 from the same side as in FIG. 3;

FIG. 8 is an enlarged, perspective view of a conduit assembly on the blower unit in FIGS. 2-7;

FIG. 9 is an enlarged, plan view of the conduit assembly in FIG. 8;

FIG. 10 is an enlarged, rear elevation view of the conduit assembly in FIGS. 8 and 9;

FIG. 12 is an enlarged, side elevation view of the conduit assembly in FIGS. 8-11.

DETAILED DESCRIPTION OF THE PREFERRED EMBODIMENT

Figure 3:
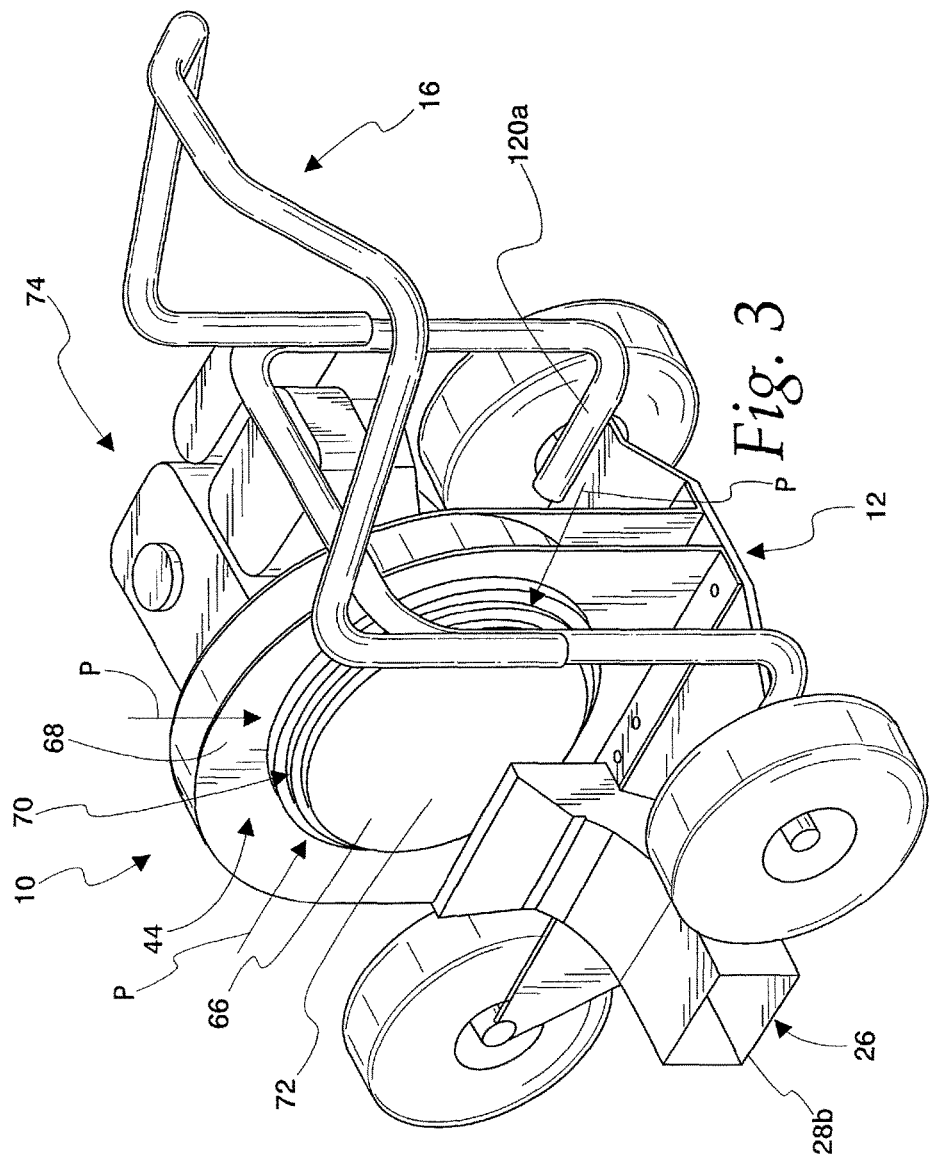
FIG. 3 is an enlarged, rear, perspective view of the blower unit in FIG. 2 from one side thereof.
Figure 4:
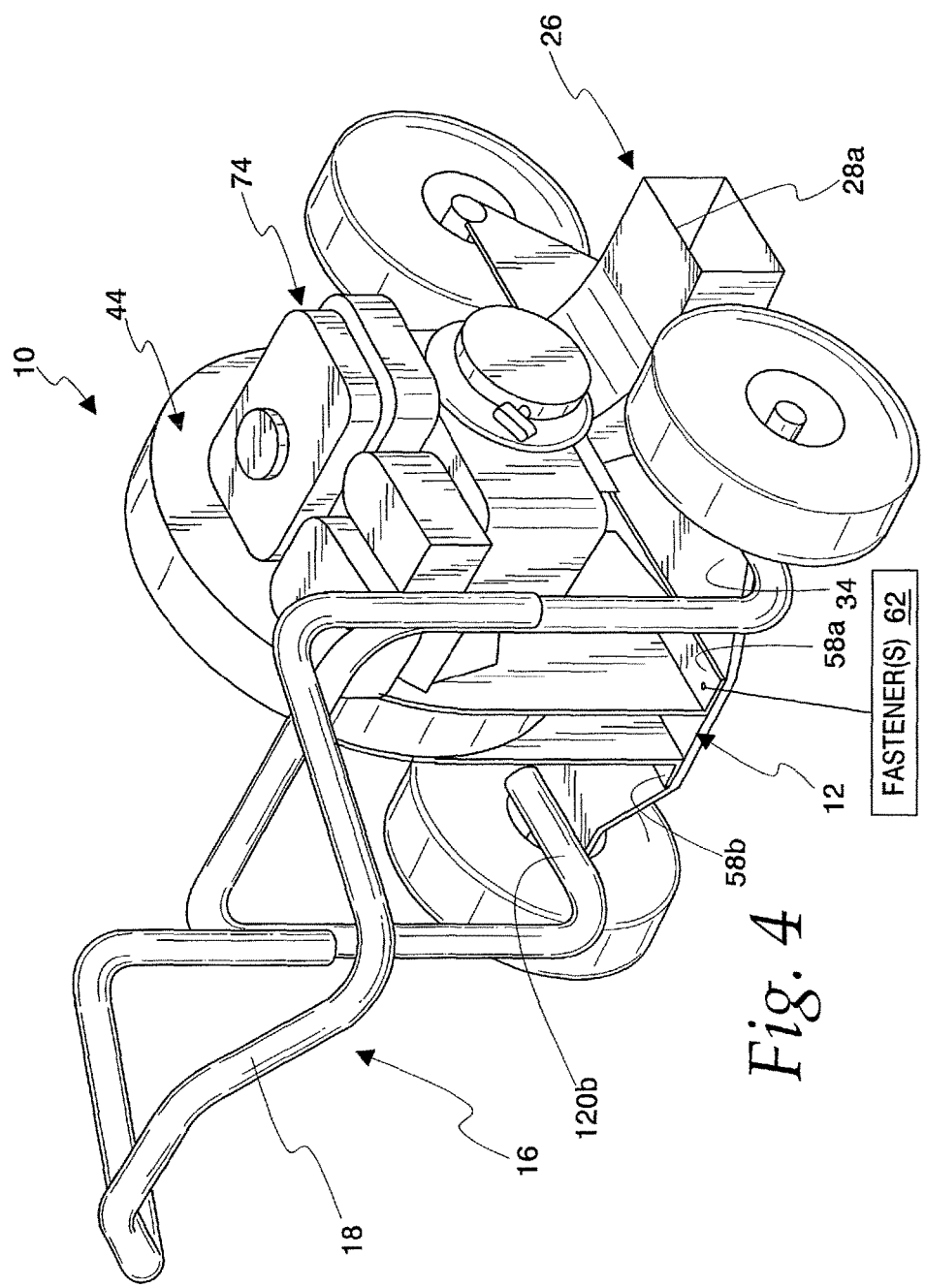
FIG. 4 is an enlarged, rear, perspective view of the blower unit in FIGS. 2 and 3 from the side opposite that in FIG. 3.

Referring initially to FIG. 1, a blower unit, according to the present invention, is shown schematically at 10.

The blower unit has a frame 12 with at least one wheel 14 thereon through which the frame 12 can be supported upon and moved over a subjacent support surface.

A handle assembly 16 with at least one gripping region 18 is connected to the frame 12 and is configured to be engaged by a user situated at the rear of the blower unit 10. At at least the gripping region 18, the user can apply forces to reposition the blower unit 10 relative to the subjacent support surface.

A source of pressurized fluid/air 20 is provided on the frame and has an outlet 22 at which a volume of pressurized air from the source 20 is discharged.

A pressurized air handling system 24 is provided on the frame and includes a conduit assembly 26 defining first and second flow paths through which pressurized air from the source outlet 22 is delivered to separate outlets 28.

The pressurized air handling system 24 further includes an air control system 30 that has at least first and second different states. In the first state, the air control system 30 causes one of: a) substantially all of the volume of pressurized air discharged at the outlet 22 to be directed in the first path to a first of the outlets 28; or b) only a part of the volume of pressurized air discharged at the outlet 22 to be directed in the first path to the first outlet 28.

In the second state, the air control system 30 causes one of: a) substantially all of the volume of pressurized air discharged at the outlet 22 to be directed in the second path to a second of the outlets 28; or b) only another part of the volume of pressurized air discharged at the outlet 22 to be directed in the second path to the second outlet 28.

The air control system 30 further includes an actuator system 32 that is operable by a user, situated as at the rear of the blower unit 10, to change the air control system 30 between its first and second states.

The schematic showing of the components making up the blower unit 10 is intended to encompass specific forms of the components, as described for an exemplary form hereinbelow, as well as virtually an unlimited number of modifications thereto, as well as the interactions of those components. The following description of the exemplary embodiment is but one of a multitude of forms contemplated.

Referring now to FIGS. 2-13, the exemplary blower unit 10 has a front F, a rear R, and laterally spaced sides S1, S2. The front, rear, and side designations are made simply for reference purposes, as the front and rear are arbitrarily identified and may be reversed.

The frame 12 consists of a flat plate 34 that has a rear portion connected to an elongate support 36. An axle 38 extends laterally through the support 36. Two rear wheels 14*a*, 14*b* are mounted to the axle 38 for rotation relative to the frame 12/frame support 36 around a laterally extending axis 39.

An L-shaped strut 42 depends from the front region of the plate 34 and provides a cantilever mount for a front wheel 14*c*.

The three wheels 14*a*, 14*b*, 14*c* together define a tricycle arrangement, with the wheel 14*c* spaced laterally midway between the wheels 14*a*, 14*b*. With this arrangement, the flat plate 34 defines a stable support for mounting various operating components, as described hereinbelow.

The pressurized air source 20 incorporates a centrifugal fan 44. The centrifugal fan 44 consists of an impeller assembly 46 with an annular array of impeller blades 48. The impeller assembly 46 resides within a chamber 50 bounded cooperatively by a housing 52 made up of joinable parts 54*a*, 54*b*. The impeller assembly 46 is journaled for rotation relative to the housing 52 within the chamber 50 around a laterally extending axis 56. The axis 56 extends in a side-to-side direction.

The centrifugal fan 44 has a conventional-type construction and is configured so that pressurized air is discharged downwardly in a stream through the outlet 22, that is defined at the bottom of the housing 52.

The housing parts 54*a*, 54*b* respectively have bottom, laterally outturned mounting flanges 58*a*, 58*b* that facially abut, to be supported by, an upwardly facing surface 60 on the plate 34. Suitable fasteners 62 secure the connections of the flanges 58*a*, 58*b* to the plate 34.

The housing part 54*b* has an opening 64 that provides an intake to the chamber 50. A vented cover 66 is secured at a laterally outwardly facing surface 68 of the housing part 54*b* and is configured to cause environmental air to be drawn radially inwardly over its entire perimeter, as indicated by the arrows P, through an annular vent structure at 70, after which the air flow is redirected to move along the axis 56 into the chamber 50 to be pressurized through the operation of the impeller assembly 46. A solid wall part 72 on the cover 66 blocks direct axial movement of the incoming air to the chamber 50.

A gas-powered drive 74 is operated to rotate the impeller assembly 46. In this embodiment, the drive is in the form of a combustion engine with an output shaft 76 that extends through a wall 75 of the housing part 54*a* and is keyed to the impeller assembly 46 so that the impeller assembly 46 turns with the shaft 76.

A bracket 78 supports the engine and is connected to the side wall 80 of the housing part 54*a* through an appropriate fastener or fasteners 82.

Throughout, there is reference herein to "fasteners", The fasteners may be any conventional type of mechanism, such as screws, bolts, etc. or may be permanent fasteners, such as welds, or interacting connector parts that effect securement.

The conduit assembly 26 is supported principally on the strut 42. The conduit assembly has an inverted "V" or "Y" shape with an inlet 84 that receives pressurized air from the outlet 22 of the pressurized air source 20. The "V" shape is defined by first and second conduit branches 86*a*, 86*b*, each extending from an apex 88 of the "V", with the branches 86*a*, 86*b* respectively communicating pressurized air delivered to the inlet 84 to outlets 28*a*, 28*b*. The underside of the "V" shape straddles the strut 42 which provides a stable support therefor.

The branches 86*a*, 86*b* have straight portions 90*a*, 90*b*, respectively, extending horizontally over a majority of the lateral extent thereof up to their respective outlets 28*a*, 28*b*.

The conduit branches 86*a*, 86*b* have flat wall portions 92*a*, 92*b*, respectively at the bottom thereof, that reside in a common horizontal plane HP that is spaced above the underlying terrain UT upon which the blower unit 10 is supported.

An adaptor 94 is connected between the housing 52 and the conduit assembly 26 to communicate pressurized air between the housing outlet 22 and the conduit assembly inlet 84. The adaptor 94 has an inlet end 96 and an outlet end 98 and defines a passageway 100 between the ends 96, 98. The passageway 100 has an area that changes between the inlet and outlet ends—increasing from the inlet end 96 towards the outlet end 98. The adaptor could be configured to have the same area between the inlet end 96 and outlet end 98.

As seen most clearly in FIGS. 5 and 6, the above-described components are incorporated efficiently into a relatively small area. The conduit assembly 26 resides within the fore-and-aft extent of the fan housing 52. The width W of the conduit assembly 26 is slightly less than the spacing between the outside surfaces 102*a*, 102*b* of the wheels 14*a*, 14*b*.

The impeller assembly 46, and the associated housing 52, have a lateral/axial width W1 centered between the sides S1, S2 of the blower unit 10. As depicted, the width W1 is less than 20% of the overall width of the blower unit 10 between the wheel surfaces 102*a*, 102*b*.

The drive 74 resides in a space at 104, extending from one side of the housing 52, towards the side S1 of the blower unit 10 and does not extend beyond, or significantly beyond, the conduit branch 86*a* where the outlet 28*a* is defined.

While the outlets 28*a*, 28*b* are shown to be configured so that pressurized air delivered thereto discharges in laterally opposite directions, as indicated by the arrows 106, 108, other combinations of discharge directions are contemplated.

The handle assembly 16 has a forwardly opening U-shaped portion 110 with a base 112 and first and second legs 114*a*, 114*b*. The base 112 as depicted is offset from a plane P1 within which the legs 114*a*, 114*b* reside and is configured to be grasped at a number of different locations by one or both hands of a user. In this embodiment, the full length of the base 112 defines the aforementioned gripping region 20.

The legs 114*a*, 114*b* are respectively supported by vertical components 116*a*, 116*b* that are laterally braced by a cross piece 118. The vertical components have orthogonal, forwardly projecting ends 120*a*, 120*b* that are suitably secured to the frame 12, specifically to one or both of the flat plate 34 and support 36.

Figure 11:
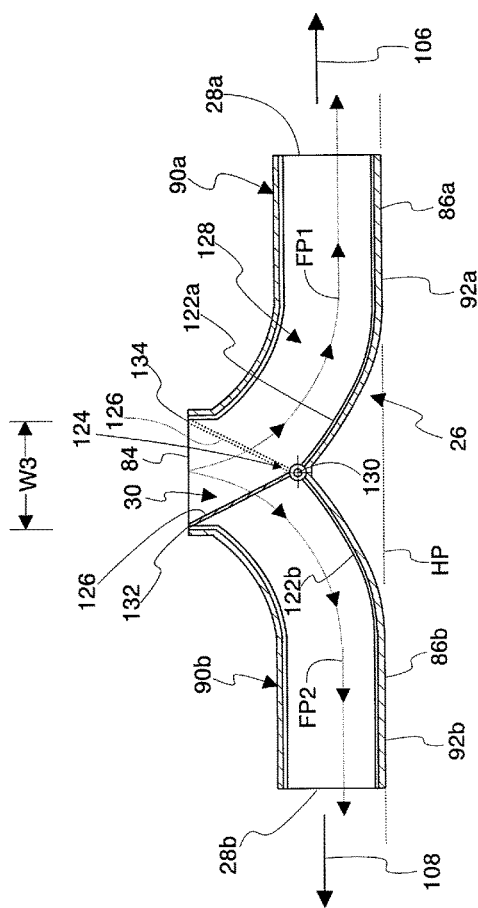
FIG. 11 is an enlarged, cross-sectional view of the conduit assembly taken along line 11-11 of FIG. 9.
Figure 13:
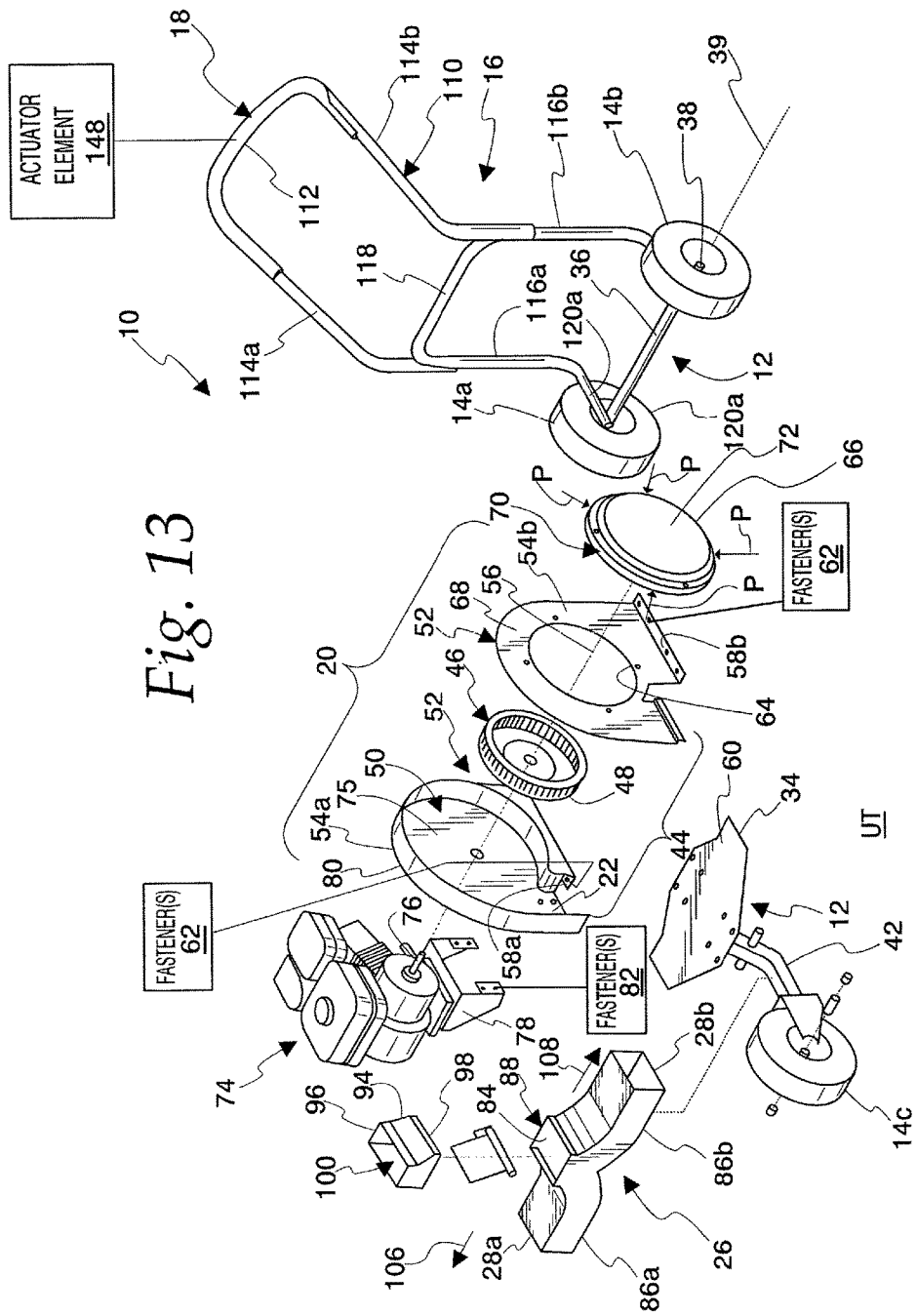
FIG. 13 is an exploded, perspective view of the blower unit in FIGS. 2-7.

As seen most clearly in FIG. 11, the conduit assembly 26 defines separate flow paths to the separate outlets 28*a*, 28*b*. More specifically, the conduit branch 86*a* has a curved inner wall surface 122*a* that intercepts downwardly traveling incoming pressurized air at the inlet 84 and causes the same to move in a first flow path identified by the arrows as FP1. Pressurized air, moving initially downwardly, is redirected to discharge horizontally in a direction indicated by the arrow 106. The conduit branch 86*b* has a corresponding surface 122*b* which causes downwardly discharged pressurized air to flow in a similar second flow path FP2 to the outlet 28*b*.

The surfaces 122*a*, 122*b* meet at a location 124 at approximately the middle of the width W3 of the inlet 84.

The air control system 30 is configured to control pressurized air delivery from the centrifugal fan 44 to the outlets 28*a*, 28*b*.

The air control system 30 includes a deflector 126 mounted within a passageway 128 defined cooperatively by the branches 86 on the conduit assembly 26.

The deflector 126 is mounted to the conduit assembly 26 for pivoting movement around a fore-and-aft axis 130 and is movable between extreme positions shown in solid and dotted lines in FIG. 11. In the solid line position, the deflector 126 abuts one edge 132 on the conduit assembly 26. In the dotted line position, the deflector abuts a diametrically opposite edge 134.

In the depicted embodiment, the passageway 128 has a rectangular cross-sectional areal shape throughout, though this is not required. As depicted, the horizontal dimension HD of the passageway 128 is greater than the vertical dimension VD thereof. The deflector 126 has a complementary shape whereby in the solid line position of FIG. 11, it substantially fully blocks air movement in the second flow path FP2, whereas in the dotted line position it substantially fully blocks air movement in the first flow path FP1.

Accordingly, with the deflector 126 in the solid line position, substantially an entire volume of pressurized air discharging at the housing outlet 22 is caused to move in the first flow path FP1 to the outlet 28*a* where it discharges in a controlled stream. In the dotted line position, the deflector 126 causes substantially the entire volume of pressurized air to move in the second flow path FP2 to and from the outlet 28*b* in a controlled stream.

In this embodiment, the deflector 126 is fixed to a post 135 that bridges spaced wall portions 136, 138 on the conduit assembly 26. The post 135 is guided by the wall portions 136, 138 in pivoting movement around the axis 130.

The post 135 projects rearwardly from the wall portion 138 and supports a lever arm 139 which is engaged by a part 140 of a control cable 142. The part 140 may be the free end of a sliding core 144 within an outer sheath 146.

The air control system 30 includes the aforementioned actuator system 32 which has an actuator element 148, as shown schematically in FIG. 9.

The actuator element 148 may take any conventional form. In the event of cable actuation, the actuator element 148 may be a simple lever that translates the cable core 144 to effect pivoting of the lever arm 139 and thus the deflector 126 that follows movement of the lever arm 139.

The user operable actuator system 32 may take other forms. It is preferred that the actuator system be operable by a user spaced a substantial distance from the deflector 126. In one preferred form, the actuator element 148 is provided on the handle assembly 16 and more preferably in the vicinity of the gripping region 18 so that a user can reposition the deflector 126 while maneuvering the blower unit 10 through the handle assembly 16. For example, the user may maintain a hold on the gripping region 18 with one hand while effecting movement of the deflector 126 through the actuator element 148. To this end, the actuator system is preferably operable by a user situated at the rear of the blower unit 10.

The air control system 30 is preferably configured so that the air control system 30 can assume different states resulting from the movement of the deflector 126. Preferably, the air control system has at least first and second states, with potentially multiple more. For example, in FIG. 11, the air control system 30 is in one state with the deflector 126 in the solid line position and in another state with the deflector 126 in the dotted line position. With these two different states, substantially the entire volume of pressurized air generated by the centrifugal fan 44 is discharged through one of the outlets 28*a*, 28*b* to the exclusion of the other outlet 28*a*, 28*b*.

An alternative state is possible wherein only part of the volume of pressurized air discharged by the centrifugal fan is directed into one or both of the paths FP1, FP2. As just one example, the deflector 126 might assume a position intermediate the solid and dotted line position at FIG. 11 whereby the discharging volume of pressurized air is split between the flow paths FP1, FP2. Other combinations of flow distribution are contemplated.

The foregoing disclosure of specific embodiments is intended to be illustrative of the broad concepts comprehended by the invention.

The invention claimed is:

1. A blower unit having a front and rear and laterally spaced sides, the blower unit comprising:
    a frame;
    at least one wheel on the frame through which the frame can be supported upon and moved over a subjacent support surface;
    a handle assembly with at least one gripping region that is configured to be engaged by a user situated at the rear of the blower unit and at which forces can be applied by the user to reposition the blower unit relative to a subjacent support surface;
    a source of pressurized air having an outlet at which a volume of pressurized air is discharged; and
    a pressurized air handling system on the frame comprising a conduit assembly defining first and second flow paths through which pressurized air from the outlet of the source of pressurized air is delivered respectively to first and second outlets,
    the pressurized air handling system further comprising an air control system,
    the air control system having at least first and second states,
    the air control system in the first state causing one of: a) substantially all of the volume of pressurized air discharged at the outlet of the source of pressurized air to be directed in the first path to the first outlet; or b) only a part of the volume of pressurized air discharged at the outlet of the source of pressurized air to be directed in the first path to the first outlet,
    the air control system in the second state causing one of: a) substantially all of the volume of pressurized air discharged at the outlet of the source of pressurized air to be directed in the second path to the second outlet; or b) only another part of the volume of pressurized air discharged at the outlet of the source of pressurized air to be directed in the second path to the second inlet, wherein the air control system further comprises a user operable actuator system with an actuator element that is situated adjacent the rear of the blower unit and operable by a user situated at the rear of the blower unit to change the air control system between the first and second states, wherein the source of air comprises a centrifugal fan, the centrifugal fan having an impeller assembly that turns around an axis that extends in a side-to-side direction.

2. The blower unit according to claim 1 wherein the actuator element is on the handle assembly.

3. The blower unit according to claim 1 wherein the centrifugal fan has a housing that defines the outlet for the source of pressurized air and is configured to cause pressurized air to be propelled downwardly to the conduit assembly.

4. The blower unit according to claim 1 wherein the conduit assembly has an inverted "V" shape with an inlet that receives pressurized air from the outlet for the source of pressurized air, the "V" shape defined by first and second conduit branches each extending from an apex of the "V" and respectively communicating pressurized air to the first and second outlets.

5. The blower unit according to claim 4 wherein the first and second conduit branches respectively have first and second straight portions that extend horizontally respectively up to the first and second outlets.

6. The blower unit according to claim 4 wherein the first and second conduit branches have bottom flat wall portions that reside in a common horizontal plane.

7. The blower unit according to claim 4 wherein the centrifugal fan has a housing that defines the outlet for the source of pressurized air and is configured to cause pressurized air to be propelled downwardly to the inlet of the conduit assembly.

8. The blower unit according to claim 7 wherein the blower unit further comprises an adaptor between the outlet for the source of pressurized air and the inlet of the conduit assembly, the adaptor assembly having an inlet end and an outlet end and a passageway that communicates between the inlet and outlet ends.

9. The blower unit according to claim 1 wherein the air control system comprises a deflector that is moved relative to the conduit assembly as the air control system is changed between the first and second states.

10. The blower unit according to claim 9 wherein the deflector pivots around an axis relative to the conduit assembly between first and second positions, the deflector in the first position with the air control system in the first state and in the second position with the air control system in the second state.

11. The blower unit according to claim 10 wherein the air control system comprises a cable part that is movable to change the position of the deflector and the actuator element is on the handle assembly.

12. The blower unit according to claim 1 wherein with the air control system in the first state substantially all of the volume of pressurized air discharged at the outlet of the source of pressurized air is directed in the first path to the first outlet and with the control system in the second state substantially all of the volume of pressurized air discharged at the outlet of the source of pressurized air is directed in the second path to the second outlet.

13. The blower unit according to claim 1 wherein the at least one wheel comprises two rear wheels and a front wheel laterally between the two rear wheels.

14. The blower unit according to claim 1 wherein the handle assembly comprises a forwardly opening U-shaped portion with a base and first and second legs projecting forwardly from the base and the base has a part that is configured to be grasped by a user.

15. The blower unit according to claim 1 wherein the impeller assembly has an axial width centered between the laterally spaced sides of the blower unit.

16. The blower unit according to claim 15 wherein the source of pressurized air comprises a drive for the impeller assembly that resides in a space extending from one side of the impeller assembly towards one side of the blower unit.

17. The blower unit according to claim 16 wherein the centrifugal fan has a housing that defines the outlet for the source of pressurized air and the drive for the impeller assembly is supported in an operative position by the centrifugal fan housing.

18. The blower unit according to claim 1 wherein the conduit assembly is configured so that pressurized air delivered to the first and second outlets discharges from the first and second outlets respectively in first and second streams directed in laterally opposite directions.

19. The blower unit according to claim 1 wherein the first and second flow paths are directed substantially horizontally.

20. The blower unit according to claim 1 wherein the first and second flow paths are directed substantially laterally.

* * * * *